US012561350B2

(12) United States Patent
Choi et al.

(10) Patent No.: US 12,561,350 B2
(45) Date of Patent: Feb. 24, 2026

(54) METHOD OF RECOMMENDING SIMILAR QUESTION, AND COMPUTING DEVICE FOR PERFORMING THE SAME

(71) Applicant: CLASSUM Co., Ltd., Seoul (KR)

(72) Inventors: Minseong Choi, Seoul (KR); Chaerin Lee, Seoul (KR); Miyeon Ha, Seoul (KR)

(73) Assignee: CLASSUM Co., Ltd., Seoul (KR)

( * ) Notice: Subject to any disclaimer, the term of this patent is extended or adjusted under 35 U.S.C. 154(b) by 256 days.

(21) Appl. No.: 18/121,741

(22) Filed: Mar. 15, 2023

(65) Prior Publication Data

US 2024/0126793 A1    Apr. 18, 2024

(30) Foreign Application Priority Data

Oct. 14, 2022    (KR) ........................ 10-2022-0132727
Dec. 9, 2022    (KR) ........................ 10-2022-0171902

(51) Int. Cl.
*G06F 16/332*       (2025.01)
*G06F 16/3329*      (2025.01)
*G06F 16/3332*      (2025.01)
*G06F 16/35*        (2019.01)

(52) U.S. Cl.
CPC ...... *G06F 16/3323* (2019.01); *G06F 16/3329* (2019.01); *G06F 16/3334* (2019.01); *G06F 16/35* (2019.01)

(58) Field of Classification Search
CPC .. G06F 16/3323; G06F 16/3334; G06F 16/35; G06F 16/3329
See application file for complete search history.

(56) References Cited

U.S. PATENT DOCUMENTS

| | | | |
|---|---|---|---|
| 10,956,822 B1 | 3/2021 | Kern et al. | |
| 2002/0128818 A1* | 9/2002 | Ho | G09B 7/04 |
| | | | 707/999.001 |
| 2003/0186206 A1* | 10/2003 | Fujino | G09B 7/00 |
| | | | 434/323 |
| 2010/0153094 A1* | 6/2010 | Lee | G06F 16/3329 |
| | | | 704/9 |
| 2011/0289163 A1* | 11/2011 | Edwards | G06F 9/542 |
| | | | 709/206 |
| 2014/0052716 A1* | 2/2014 | Chakra | G06F 16/951 |
| | | | 707/723 |
| 2018/0040085 A1 | 2/2018 | Tal-Botzer | |

(Continued)

FOREIGN PATENT DOCUMENTS

| | | |
|---|---|---|
| JP | 2003228585 A | 8/2003 |
| JP | 7104255 B1 | 7/2022 |

OTHER PUBLICATIONS

Office Action issued in corresponding JP Application No. 2023-038698, issued Apr. 3, 2024, and an English Translation, 12 pages.

(Continued)

*Primary Examiner* — Sonia L Gay
(74) *Attorney, Agent, or Firm* — Burris Law, PLLC

(57)    ABSTRACT

A method of recommending a similar question includes receiving a question from a user, setting a search range for searching for a question similar to the received question, searching for at least one question similar to the received question within the set search range, and recommending the at least one searched question to the user.

20 Claims, 10 Drawing Sheets

(56) References Cited

U.S. PATENT DOCUMENTS

| | | |
|---|---|---|
| 2018/0341871 A1 | 11/2018 | Maitra et al. |
| 2019/0243900 A1* | 8/2019 | Gan ........................ G06F 40/30 |
| 2020/0210776 A1* | 7/2020 | Xiong .................... G06F 40/35 |
| 2020/0227026 A1 | 7/2020 | Rajagopal et al. |
| 2020/0356604 A1 | 11/2020 | Macdougall |
| 2021/0149964 A1* | 5/2021 | Wang .................... G06N 20/00 |
| 2021/0165800 A1* | 6/2021 | Kim ...................... G06F 16/252 |
| 2021/0165833 A1 | 6/2021 | Kim et al. |
| 2022/0269386 A1 | 8/2022 | D'Angelo et al. |

OTHER PUBLICATIONS

Classum Co., Ltd., Description of Evidential Material, and an English Translation, dated Mar. 15, 2022, 6 pages.
Examination Report issued in corresponding AU Application 2023201618, issued Nov. 24, 2023, 5 pages.
Exam Report No. 2 issued in corresponding AU Application No. 2023201618, issued Sep. 26, 2024, 7 pages.
Office Action issued in corresponding KR Application No. 10-2022-01741902, issued Sep. 17, 2025, and an English Translation, 12 pages.

* cited by examiner

FIG. 3

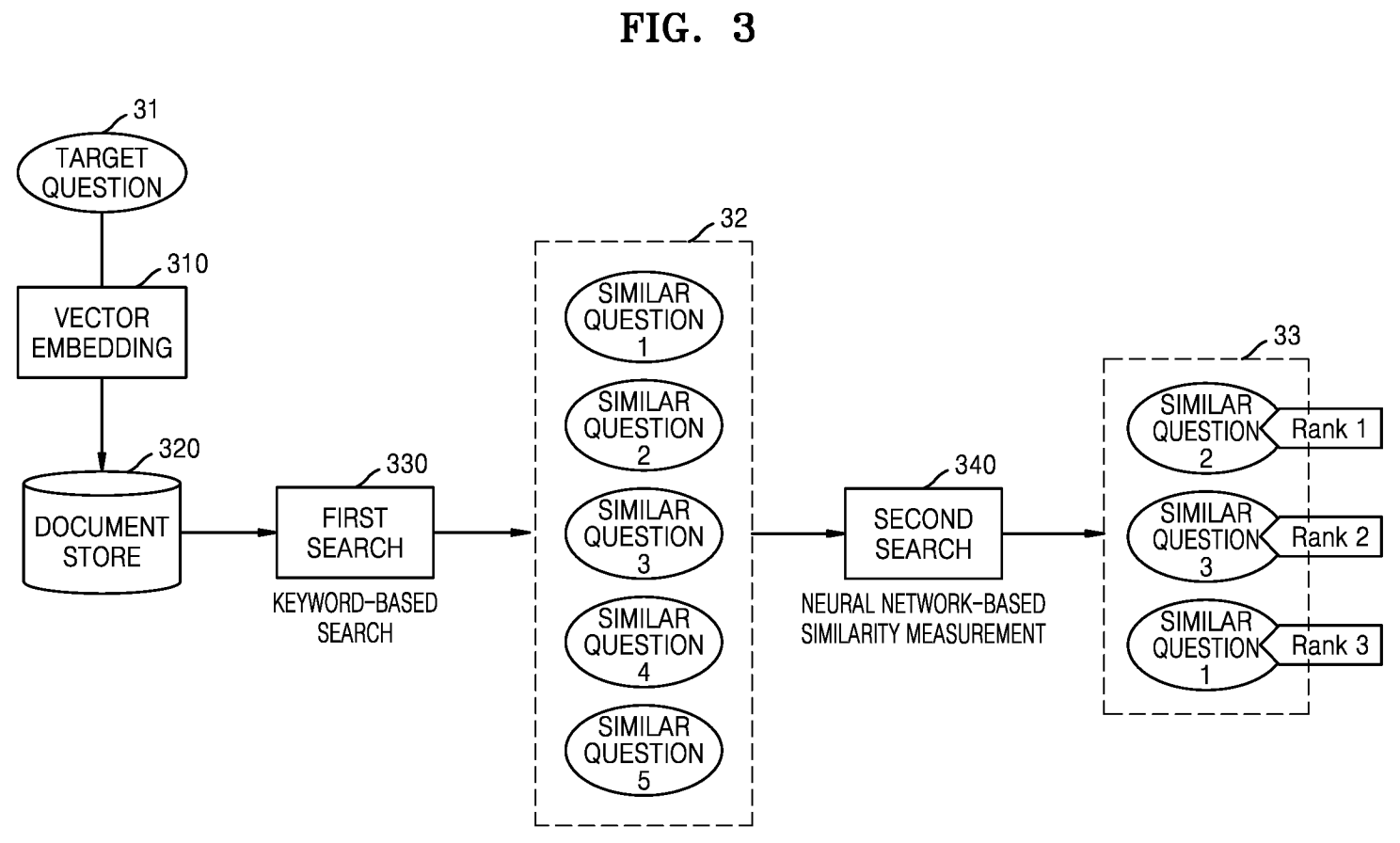

31 TARGET QUESTION

310 VECTOR EMBEDDING

320 DOCUMENT STORE

330 FIRST SEARCH

KEYWORD-BASED SEARCH

32

SIMILAR QUESTION 1

SIMILAR QUESTION 2

SIMILAR QUESTION 3

SIMILAR QUESTION 4

SIMILAR QUESTION 5

340 SECOND SEARCH

NEURAL NETWORK-BASED SIMILARITY MEASUREMENT

33

SIMILAR QUESTION 2    Rank 1

SIMILAR QUESTION 3    Rank 2

SIMILAR QUESTION 1    Rank 3

FIG. 9

METHOD OF RECOMMENDING SIMILAR QUESTION, AND COMPUTING DEVICE FOR PERFORMING THE SAME

CROSS-REFERENCE TO RELATED APPLICATION

This application is based on and claims priority under 35 U.S.C. § 119 to Korean Patent Application No. 10-2022-0132727, filed on Oct. 14, 2022, and Korean Patent Application No. 10-2022-0171902, filed on Dec. 9, 2022, in the Korean Intellectual Property Office, the disclosures of which are incorporated by reference herein in their entirety.

BACKGROUND

1. Field

Embodiments disclosed herein relate to a method of recommending a similar question and a computing device for performing the method.

2. Description of the Related Art

An online platform service that provides users (students) with educational services, such as lectures at universities or academies, are widely used. A user may access information uploaded by an administrator (a professors or so on) through the online platform, may communicate with people (a professor and other students taking the same lecture) related to a lecture in the online platform, and may ask a question related to a lecture and get an answer as necessary.

A system in which a user registers a question in an online platform and another person (an administrator or another user) registers an answer to the registered question has a disadvantage in that the user has to wait for someone else to answer after the question is registered, the administrator has to register answers one by one to all questions registered by users, and particularly, when there are many duplicate or similar questions among the questions of the users, the administrator has to register the same answer multiple times unnecessarily.

In addition, the background art described above may be technical information that the inventor has for derivation of the present disclosure or acquires during derivation of the present disclosure, and may not be said to be disclosed to the general public prior to filing the present disclosure.

SUMMARY

Embodiments disclosed herein provide a method of recommending a similar question in an online platform that provides educational services and a computing device for performing the method.

Additional aspects will be set forth in part in the description which follows and, in part, will be apparent from the description, or may be learned by practice of the presented embodiments of the disclosure.

According to an aspect of the present disclosure, a method includes receiving a question from a user, setting a search range for searching for a question similar to the received question, searching for at least one question similar to the received question within the set search range, and recommending the at least one searched question to the user.

According to another aspect of the present disclosure, there is provided a computer program for performing a method of recommending a similar question, the method including receiving a question from a user, setting a search range for searching for a question similar to the received question, searching for at least one question similar to the received question within the set search range, and recommending the at least one searched question to the user.

According to another aspect of the present disclosure, there is provided a computer-readable medium in which a program for performing a method of recommending a similar question is recorded, the method including receiving a question from a user, setting a search range for searching for a question similar to the received question, searching for at least one question similar to the received question within the set search range, and recommending the at least one searched question to the user.

According to another aspect of the present disclosure, a computing device that recommends a similar question includes an input/output interface configured to receive a question from a user and configured to recommend at least one question similar to the received question to the user, a memory configured to store a program for searching for and recommending the similar question, and at least one processor, wherein the at least one processor executes the program to receive a question from a user, set a search range for searching for a question similar to the received question, search for at least one question similar to the received question within the set search range, and recommend the at least one searched question to the user.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a process of searching for and recommending a similar question similar to a target question input by a user, according to an embodiment of the present disclosure;

FIG. 9 is a diagram illustrating a method of connecting classes to each other to expand a search range for a target question, according to an embodiment of the present disclosure.

DETAILED DESCRIPTION

Figure 1:
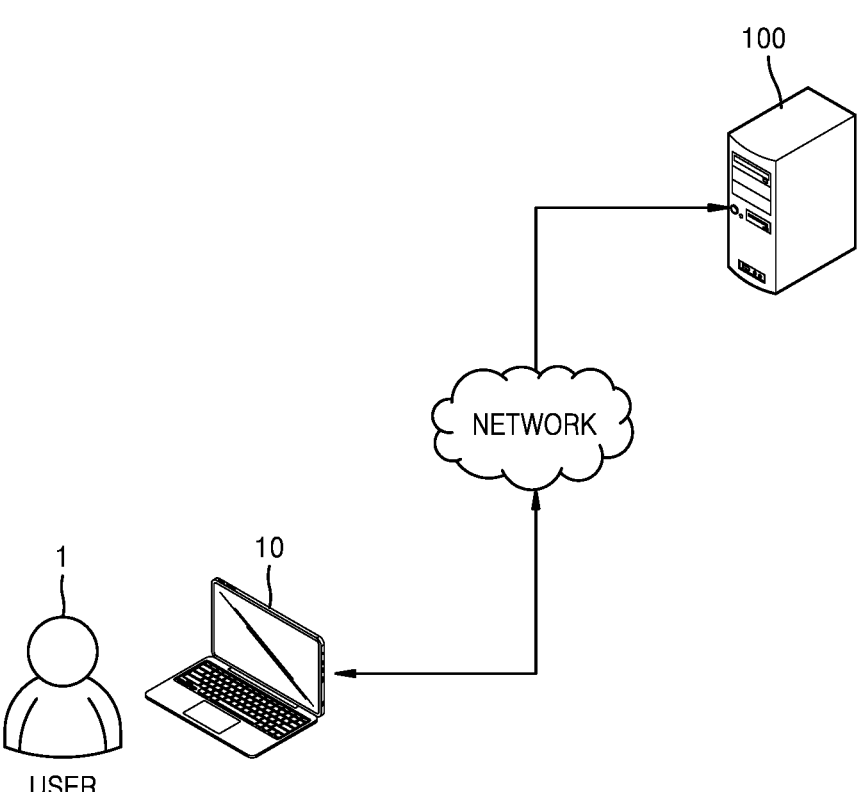
FIG. 1 is a diagram illustrating a system that performs a method of recommending a similar question, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments will be described in detail with reference to the accompanying drawings. Embodiments to be described below may also be modified and implemented in various different forms. In order to more clearly describe characteristics of the embodiments, detailed descriptions of matters widely known to those skilled in the art to which the following embodiments belong are omitted. In the drawings, parts irrelevant to the descriptions of the embodiments are omitted, and similar reference numerals are attached to similar parts throughout the specification.

Throughout the specification, when a component is described to be "connected" to another component, this includes not only a case of being "directly connected", but also a case of being "connected thereto with another component therebetween". In addition, when a certain component "includes" a certain component, this means that other components may be further included therein without excluding other components unless otherwise stated.

Prior to describing embodiments of the present disclosure, meanings of terms frequently used in the present disclosure are first defined.

An 'online platform' refers to a platform that provides an educational service online, and a method of recommending a similar question according to embodiments of the present disclosure may be implemented in an online platform. According to an embodiment, the online platform may provide a plurality of classes, and a user may participate in (for example, take) at least one of a plurality of classes (for example, lectures). According to an embodiment, a main purpose of the online platform is to provide an education-related service to users, and during the process, when a user inputs a question (a target question), a service that recommends a question (a similar question) similar thereto may be provided.

A "class" indicates a unit obtained by dividing an educational service provided through an online platform. Classes may be classified according to a subject of education to be provided, a person providing education, a period in which education is provided, and so on. According to an embodiment, a lecture in a certain semester provided by a certain professor may correspond to one class.

A "target question" indicates a question that a user registers in an online platform in the embodiments of the present disclosure, and a "similar question" indicates a question searched for as a question similar to a target question registered by a user in the embodiments of the present disclosure.

A term "search range" indicates a range for searching for a similar question to the target question. According to an embodiment, the search range includes a plurality of questions, and when a user inputs a target question, a similar question may be searched for among the plurality of questions included in the search range.

Hereinafter, embodiments will be described in detail with reference to the accompanying drawings.

FIG. 1 is a diagram illustrating a system for that performs a method of recommending a similar question, according to an embodiment of the present disclosure. The system of FIG.

1 may provide an online platform and perform a method of recommending a similar question in the online platform.

Referring to FIG. 1, a system that performs a method of recommending a similar question, according to an embodiment, may include a user terminal 10 and a server 100, and the user terminal 10 and the server 100 may be connected to each other through a network to perform wired and wireless communications.

The user terminal 10 refers to a computing device that a user 1 directly operates to receive a service provided by the online platform. According to one embodiment, the user terminal 10 may be any one of various types of computing devices having calculation and communication functions, such as a desktop computer, a laptop computer, a smartphone, and a tablet computer. The user 1 may receive an education service (for example, taking an online lecture) provided by the online platform through the user terminal 10, input a target question, and check a similar question recommended according thereto.

The server 100 refers to a computing device that performs an actual operation for operating an online platform. According to one embodiment, when the user 1 inputs a request (for example, a request to reproduce an online lecture, a request to register a target question, and so on) related to a service through the user terminal 10, the server 100 may perform operations according to the request and transmit a result of the operations to the user terminal 10.

It is assumed that operations for recommending a similar question according to the embodiments described in the present disclosure are basically performed by the server 100. In other words, the user 1 may access an online platform through the user terminal 10 and receive an education service and a similar question recommendation service included therein, but the actual operations required to provide the service may be performed by the server 100, and the user terminal 10 may provide only a user interface (UI) to the user 1. However, the present disclosure is not limited thereto, and some or all of the operations described as performed by the server 100 in the present disclosure may also be performed by the user terminal 10. That is, according to one embodiment, a system that performs a method of recommending a similar question may include only the user terminal 10 without the server 100, and all operations described as performed by the server 100 in the present disclosure may also be performed by the user terminal 10.

Figure 2:
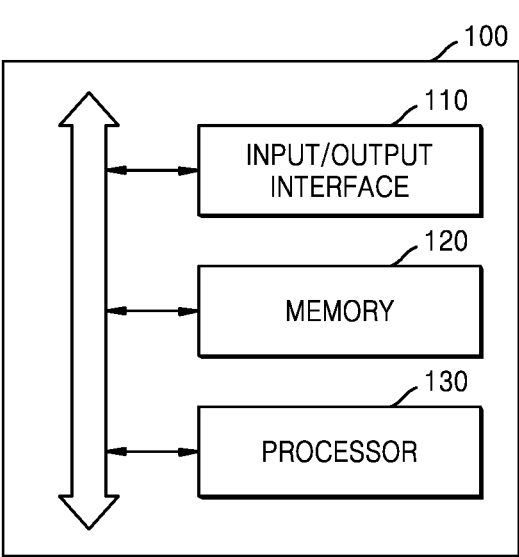
FIG. 2 is a block diagram illustrating a configuration of a computing device that performs a method of recommending a similar question, according to an embodiment of the present disclosure.

FIG. 2 is a block diagram illustrating a configuration of a computing device that performs a method of recommending a similar question, according to an embodiment of the present disclosure. As described above, it is assumed that operations for recommending a similar question according to one embodiment are performed by the server 100, and accordingly, the computing device illustrated in FIG. 2 corresponds to the server 100 of FIG. 1.

Referring to FIG. 2, the server 100 may include an input/output interface 110, a memory 120 and a processor 130.

The input/output interface 110 may receive a request of the user 1 or a control command from the user 1 and output a result of processing according thereto. The input/output interface 110 may directly receive a request or a control command from the user 1, but may also receive a request or a control command from the user 1 through the user terminal 10. Likewise, the input/output interface 110 may directly output a result of processing according to the request of the user 1 or the control command from the user 1, but may also output the request or the control command through the user terminal 10.

According to one embodiment, the input/output interface 110 of the server 100 may receive a request of the user 1 or a control command from the user 1 through communication with the user terminal 10, and transmit a result of processing according thereto to the user terminal 10, and accordingly, the input/output interface 110 may have a configuration for performing wired/wireless communication. For example, the input/output interface 110 may include a communication chipset supporting various communication protocols.

The memory 120 may store various programs or data and may be composed of a storage medium, such as read only memory (ROM), random access memory (RAM), a hard disk, a compact disk (CD)-ROM, or a digital video disk (DVD), or a combination thereof. The memory 120 may be included in the processor 130 without being provided separately. The memory 120 may include a volatile memory, a nonvolatile memory, or a combination thereof. The memory 120 may store a program for performing operations according to embodiments to be described below. The memory 120 may provide the stored data to the processor 130 according to a request of the processor 130.

The processor 130 may control a series of processes such that the server 100 operates according to embodiments to be described below and may include one or more processors. In this case, the one or more processors may include a general-purpose processor, such as a central processing unit (CPU), an application processor (AP), or a digital signal processor (DSP), a graphics-only processor, such as a graphics processing unit (GPU) or a vision processing unit (VPU), or an artificial intelligence-only processor, such as a neural network processing unit (NPU). For example, when one or more processors are processors dedicated to artificial intelligence, the processors dedicated to artificial intelligence may each be designed as a hardware structure specialized for processing a certain artificial intelligence model.

The processor 130 may write data to the memory 120 or read data stored in the memory 120, and in particular may execute a program stored in the memory 120 to process data according to a predefined operation rule or an artificial intelligence model. Accordingly, the processor 130 may perform operations described in the following embodiments, and operations described as being performed by the server 100 in the following embodiments may be performed by the processor 130 unless otherwise stated.

FIG. 3 is a diagram illustrating a process of searching for and recommending a similar question similar to a target question input by a user, according to an embodiment of the present disclosure.

The processing operations performed in FIG. 3, such as vector embedding 310, a first search 330, and a second search 340, may be performed as the processor 130 of the server 100 executes a program stored in the memory 120.

Referring to FIG. 3, when a target question 31 is input, the server 100 may perform vector embedding 310 for the target question 31 to convert the target question 31 into a vector, and then may store the converted vector in a document store 320.

According to one embodiment, when the user 1 accesses an online platform provided by the server 100 through the user terminal 10 and inputs a target question 31, the server 100 may receive the target question 31 from the user terminal 10 and convert the target question 31 into a vector by performing vector embedding 310 therefor. The server 100 may store the converted vector from the target question 31 in the document store 320 of the memory 120.

The vector converted from the target question 31 and stored in the document store 320 may be included in a search range for searching for a similar question therefor when the user 1 registers other questions in the online platform later. In other words, all questions registered by users using the online platform may be converted into vectors and stored in the document store 320, and when a new question is registered in the online platform thereafter, the server 100 may search for a similar question from at least some of the vectors (questions) stored in the document store 320.

According to the embodiment of the present disclosure, all questions registered in the online platform may be embedded and stored in the document store 320 in the form of vectors, and whenever a new question is registered or a previously registered question is inquired, similarity may be measured by using the previously stored vectors, and thus, a processing speed may be increased.

In processes to be described below, operations of searching for similar questions based on keywords and measuring similarity between questions may all be performed by processing "vectors" converted from the questions, but may be described as processing (for example, extracting questions, assigning a rankings to the questions, and so on) "question" for the sake of ease of description.

The server 100 may check questions included in a search range for the target question 31 among questions previously stored in the document store 320, and may perform the first search 330 for the questions included in the search range. A specific method for setting a search range for the target question 31 by using the server 100 will be described in detail with reference to FIG. 7 below.

According to one embodiment, the first search 330 may correspond to the form of a sparse retrieval for performing a search based on keywords. The server 100 may extract at least one keyword from the target question 31 and may extract (extract, for example, a question including some keywords or some words similar to the keywords) at least one of similar questions similar to the target question 31 among questions stored in the document store 320, based on the extracted keywords. According to one embodiment, the user 1 may intervene in selecting keywords when registering the target question 31, which will be described in detail with reference to FIG. 8 below.

In the embodiment illustrated in FIG. 3, it is assumed that the server 100 extracts five similar questions (similar question 1 to similar question 5) from the document store 320 as a result of performing the first search 330. According to one embodiment, the server 100 may extract, as similar questions, all questions including at least one keyword extracted from the target question 31 from among the questions stored in the document store 320. Alternatively, according to one embodiment, the server 100 may check the number of times that the keyword extracted from the target question 31 appears for each of the questions stored in the document store 320, and extract, as similar questions, the preset number of questions in the order of the number of times. In addition, the server 100 may perform the first search 330 based on keywords in various ways.

In the embodiment illustrated in FIG. 3, a first search result 32 may include five similar questions. According to one embodiment, the server 100 may perform the second search 340 for some of the similar questions (similar question 1 to similar question 3) included in the first search result 32, and similar questions that are targets of the second search 340 may be selected in the order of high keyword-based similarity (for example, the more the number of keywords, the higher the similarity). According to one embodiment, the server 100 may also perform the second search 340 for all similar questions included in the first search result 32.

According to one embodiment, the second search 340 may be a dense retrieval for measuring similarity between questions based on a neural network. According to one embodiment, a neural network model learned to infer similarity between questions may be stored in the memory 120 of the server 100 and executed by the processor 130. When the second search 340 is executed for similar question 1 to similar question 3 of the first search result 32, the processor 130 of the server 100 may execute a neural network model to measure (infer) similarities between similar question 1 to similar question 3 and the target question 31 and may assign rankings to the similar questions in the order of the measured similarities. It can be seen from the second search result 33 that rankings according to similarities with the target question 31 are assigned to similar question 1 to similar question 3.

The server 100 may transmit similar questions (similar question 1 to similar question 3) searched for the target question 31 to the user terminal 10 along with corresponding rankings, and the user terminal 10 may display a UI screen representing and recommending rankings of the similar questions. When the user 1 selects one of the similar questions included in the second search result 33 through an input/output interface (for example, a keyboard, a mouse, or so on) of the user terminal 10, the server 100 may cause a previously registered answer to the selected similar question to be displayed on a screen of the user terminal 10.

According to the embodiment described above, when inputting the target question 31 through the user terminal 10, the user 1 may receive a recommendation for at least one similar question similar to the target question 31 along with rankings from the server 100, and when selecting one of the recommended similar questions, the user 1 may be provided a previously registered answer to the selected similar question Accordingly, the user 1 may immediately resolve his curiosity by checking the previously registered answers to the similar question similar to the target question 31 even before an online platform manager registers an answer to the registered target question 31.

Hereinafter, a method of recommending a similar question according to embodiments of the present disclosure will be described with reference to flowcharts. FIGS. 4 to 7 are flowcharts illustrating a method of recommending a similar question according to embodiments of the present disclosure. The flow charts of FIGS. 4 to 7 include operations performed by the server 100 and the user terminal 10 described above. Accordingly, the operations described above with reference to FIGS. 1 to 3 may be equally applied to the embodiments according to the flowcharts of FIGS. 4 to 7 even when details are omitted below.

Figure 4:
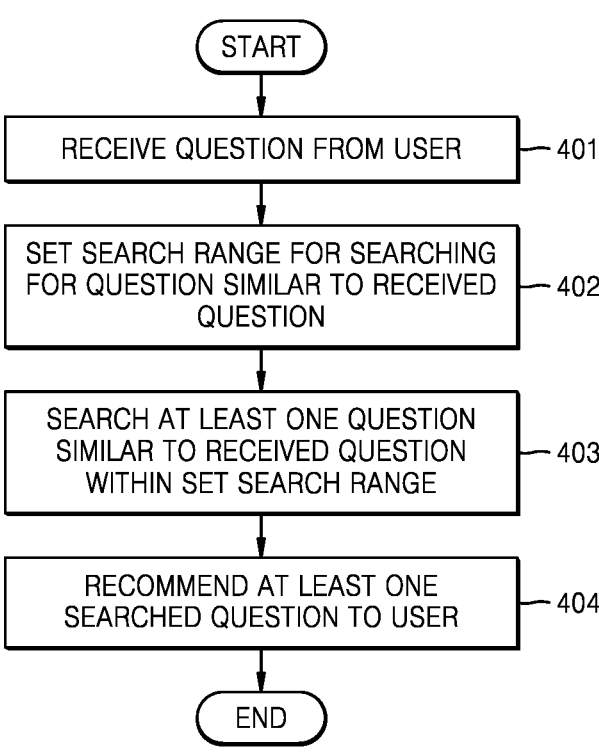
FIGS. 4 to 7 are flowcharts illustrating a method of recommending a similar question, according to embodiments of the present disclosure.

Referring to FIG. 4, the server 100 may receive a question (a target question) input by the user 1 in step 401. When the user 1 accesses an online platform through the user terminal 10 and inputs the target question, the user terminal 10 may transmit the input target question to the server 100. An example in which the user 1 inputs (registers) the target question to the online platform through the UI screen displayed on the user terminal 10 is illustrated in FIG. 8.

Figure 8:
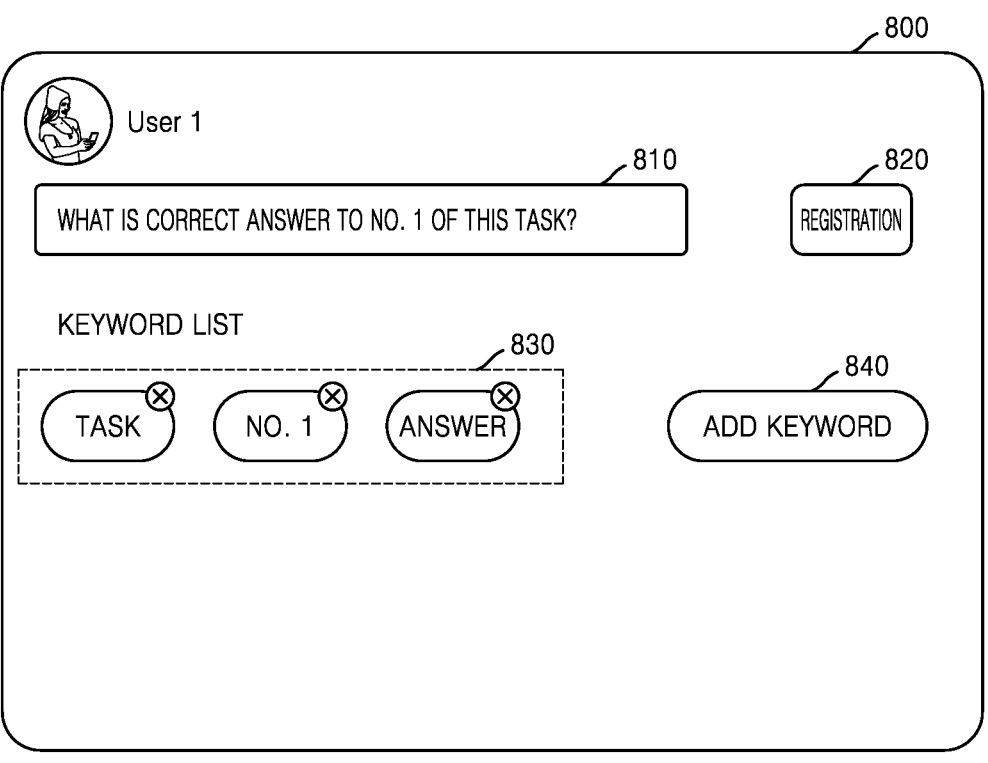
FIG. 8 is a diagram illustrating a user interface (UI) screen in a step of inputting a target question by a user to perform a method of recommending a similar question, according to an embodiment of the present disclosure.

Referring to FIG. 8, when the user 1 accesses the online platform provided by the server 100 through the user terminal 10 and moves to a menu for inputting a question, a first UI screen 800 may appear on the user terminal 10.

The user 1 may input a target question ("what is a correct answer to No. 1 of this task?") through an input window 810 of a first UI screen 800 and select a registration button 820 to register the target question in an online platform. According to one embodiment, the server 100 may show an expected keyword list (a keyword candidate list) 830 to the user 1 while the user 1 inputs the target question and support a function of allowing the user 1 to add or delete a keyword. The user 1 may check keywords included in the expected keyword list 830 and remove unwanted keywords therefrom. For example, when the user 1 wants to be recommended various similar questions related to No. 1 of a task without being limited to a "correct answer", the user 1 may remove the "correct answer" from the expected keyword list 830. In addition, when there is a keyword to be added during searching for a similar question, the user 1 may select a keyword addition button 840 and input a new keyword.

As described above, according to an embodiment of the present disclosure, the user 1 may directly adjust a keyword to be used during searching for a similar question in the process of inputting a target question, and accordingly, a question that may be of practical help to the user 1 may be searched.

Referring again to FIG. 4, in step 402, the server 100 may set a search range for searching for a question (a similar question) similar to the received question (a target question). A method for the server 100 to set a search range for a target question will be described in detail with reference to FIGS. 7 and 9.

Figure 7:
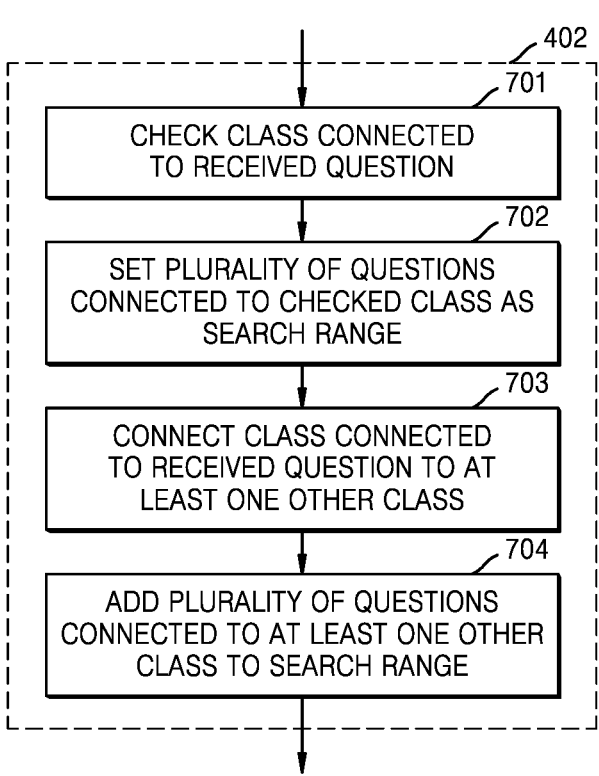

FIG. 7 illustrates detailed steps included in step 402 of FIG. 4. Step 703 and step 704 of the steps included in the flowchart of FIG. 7 may be selectively included. In other words, a process of setting a search range may include only step 701 and step 702 according to one embodiment or may include all of step 701 to step 704 according to another embodiment.

Referring to FIG. 7, in step 701, the server 100 may check a class connected to the received question (a target question). According to one embodiment, the server 100 may identify a class, in which the user 1 who registered the target question participates in an online platform, as a class connected to the target question. In one specific example, when the user 1 taking an A-lecture registers a target question while taking a certain lecture through an online platform, the server 100 may connect the target question with the A-lecture.

In addition, according to one embodiment, the server 100 may identify a class designated when the user 1 inputs a target question with a class connected to the target question. In one specific example, when the user 1 designates a B-lecture as a lecture related to the target question while registering a target question, the server 100 may connect the target question with the B-lecture.

In step 702, the server 100 may set a plurality of questions connected to the class identified as being connected to the target question as a search range. The questions previously registered by users that use the online platform may all be connected to at least one class, and accordingly, there may be a plurality of questions connected to each class. This will be described in more detail with reference to FIG. 9 below.

According to one embodiment, the server 100 may expand a search range for a target question by connecting classes to each other. Because questions connected to classes (for example, classes having similar subjects and classes of which providers are similar) related to each other may be similar to each other, similar questions may be searched well by expanding a search range to questions connected to related classes.

In step 703, the server 100 may connect a class connected to the received question (a target question) to at least one of other classes, and in step 704, the server 100 may add a plurality of questions connected to at least one other class to the search range.

A method of connecting classes to each other by using the server 100 may be performed in various ways. According to one embodiment, when a manager of an online platform selects a class to be connected to expand a search range, the server 100 may connect the class selected by the manager to a class connected to the target question.

According to one embodiment, the server 100 may automatically connect classes to each other according to a preset algorithm. For example, when a user (for example, a student) participating in a class (for example, a lecture) (a first class) connected to a target question overlaps a user participating in a certain class (a second class) at a certain rate or more, the server 100 may connect the first class to the second class. In addition, for example, when the number of times that questions connected to the second class are recommended as similar questions or the number of times that the questions connected to the second class are selected by a user after being recommended as the similar questions is greater than a reference value compared to the questions connected to the first class, the server 100 may connect the first class to the second class. When the server 100 connects the first class (a class connected to a target question) to the second class, a search range for searching for similar questions to a target question may expand to include both questions connected to the first class and questions connected to the second class.

Figure 9:
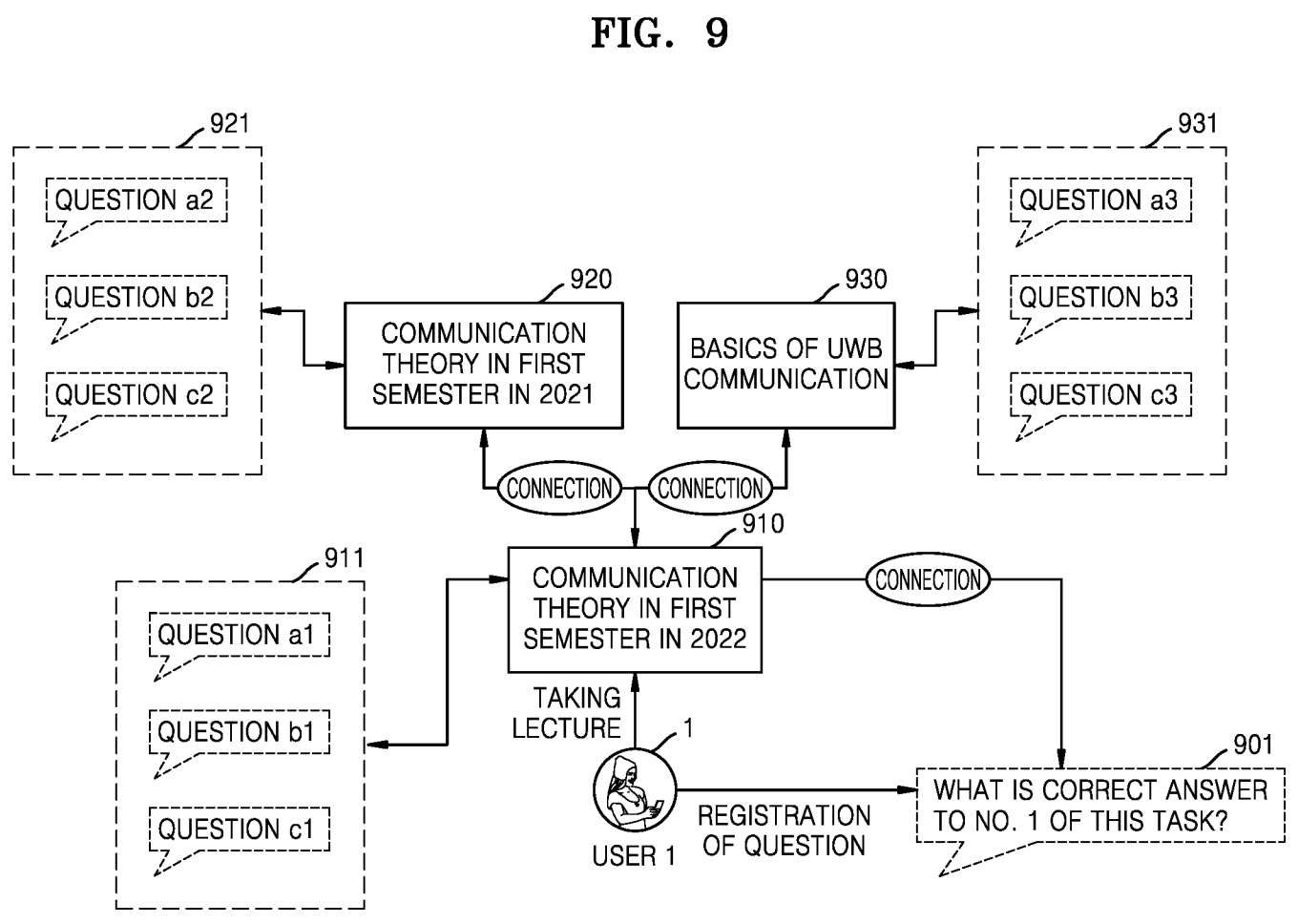

A specific embodiment in which a search range for a target question is expanded by connecting classes to each other by the server 100 will be described in detail with reference to FIG. 9. In FIG. 9, description will be made by assuming that a class is a "lecture".

Referring to FIG. 9, when the user 1 taking the first lecture (a "communication theory in the first semester of 2022") 910 registers a target question 901 in an online platform, the server 100 may connect the target question 901 to the first lecture 910. As described above, according to one embodiment, even when not taking the first lecture 910, the user 1 may designate the first lecture 910 when registering the target question 901, and accordingly, the server 100 may connect the target question 901 to the first lecture 910.

When the target question 901 is connected to the first lecture 910, a search range for the target question 901 may be set to a first question group 911 including questions connected to the first lecture 910.

As described above, the server 100 may expand the search range by connecting classes (lectures) to each other.

For example, when an administrator (for example, a professor for the first lecture) selects the second lecture ("communication theory in the first semester in 2021") 920, which is a lecture in another semester on the same topic, as a lecture to be connected to the first lecture 910, the server 100 may connect the lecture 910 to the lecture 920. Questions connected to the second lecture 920 may be included in a second question group 921. When the first lecture 910 is connected to the second lecture 920, a search range for the target question 901 may be expanded to include the first question group 911 and the second question group 921. That is, the server 100 may search for a question similar to the target question 901 among questions included in the first question group 911 and the second question group 921.

In addition, for example, when students of the first lecture 910 overlap students of a third lecture ("basics of ultrawide band (UWB) communication") 930 by a certain ratio (for example 50%) or more, the server 100 may connect the first lecture 910 to the third lecture 930. Questions connected to the third lecture 930 may be included in a third question group 931. In this way, when the second lecture 920 and the third lecture 930 are connected to the first lecture 910, a search range for the target question 901 may be extended to include all of the first question group 911 to the third question group 931.

Referring again to FIG. 4, in step 403, the server 100 may search for at least one question similar to the received question within the set search range.

Figure 5:
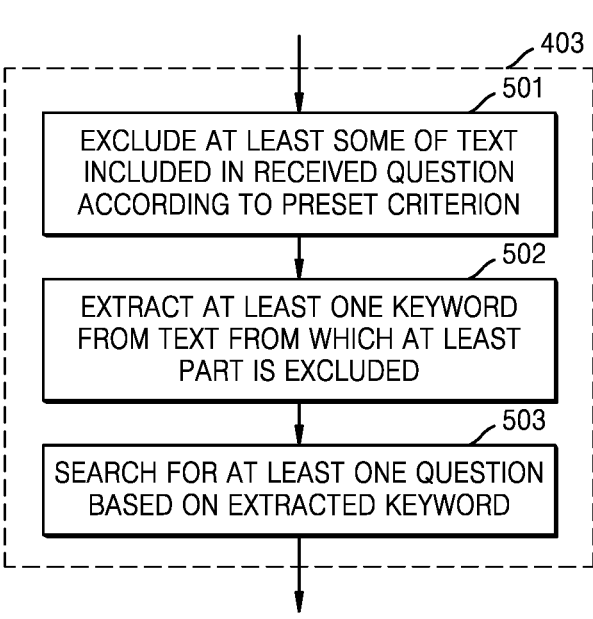

According to one embodiment of the present disclosure, a search may be performed after performing pre-processing for excluding in advance terms and so on frequently appearing in questions from target questions may be performed to increase search efficiency and accuracy of search. FIG. 5 is a flowchart illustrating a process of performing the pre-processing before search, and steps included in FIG. 5 may be detailed steps included in step 403 of FIG. 4.

Referring to FIG. 5, in step 501, the server 100 may exclude at least a part of text included in the received question according to a preset criterion. For example, there may be terms that frequently appear in common in most questions, and the server 100 may extract keywords after first excluding the terms from a target question. In addition, for example, the target question may include a source code for programming in the form of text. The server 100 may extract keywords after first excluding commands, phrases, or so on that frequently appear repeatedly in the source code from the target question. Terms or phrases to be excluded from the target question during pre-processing may be stored in advance in the memory 120 of the server 100.

In step 502, the server 100 may extract at least one keyword from the remaining texts from which at least a part is excluded. Because keywords are extracted in a state in which frequently appearing terms or phrases are excluded through the pre-processing in step 501, keywords that well represent characteristics of the target question may be extracted.

In step 503, the server 100 may search for at least one question based on the extracted keyword.

Figure 6:
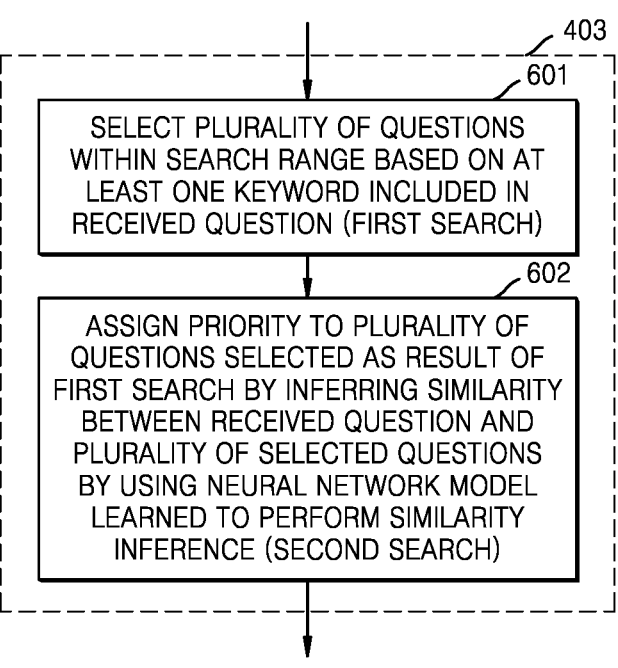

According to one embodiment of the present disclosure, the server 100 may search for similar questions through a two-step search (the first search and the second search), and thus, search accuracy is increased, and the server 100 may provide even priority (ranking) of similar questions to the user 1. FIG. 6 is a flowchart illustrating a process of performing a two-step search, and steps included in FIG. 6 may be detailed steps included in step 403 of FIG. 4.

Referring to FIG. 6, in step 601, the server 100 may perform a first search for selecting a plurality of questions within a search range based on at least one keyword included in the received question (a target question).

In step 602, the server 100 may perform a second search for assigning a priority (a ranking) to a plurality of questions selected as a result of the first search by inferring similarity between the received question and the plurality of selected questions by using a neural network model learned to perform similarity inference.

Referring again to FIG. 4, in step 404, the server 100 may recommend at least one searched question to a user. According to one embodiment, the server 100 may recommend a preset number of similar questions in the order of highest assigned priority, and may display the assigned priority in each similar question that is recommended. For example, the server 100 may transmit information on a plurality of similar questions for the target question and rankings of the similar questions to the user terminal 10, and the user terminal 10 may display a UI screen including the similar questions and the rankings. The user 1 may check the similar questions and the rankings through the UI screen, and select a similar question to check a previously registered answer to the corresponding similar question. A specific example of the UI screen for recommending similar questions will be described in detail with reference to FIG. 10.

Figure 10:
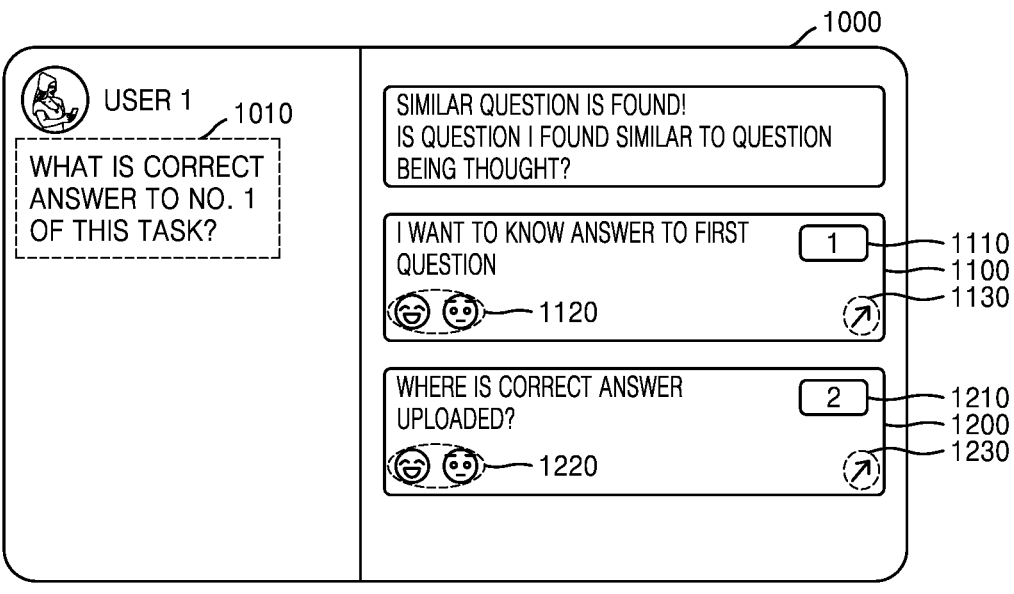
FIG. 10 is a diagram illustrating a UI screen for recommending a similar question to a target question, according to an embodiment of the present disclosure.

FIG. 10 is a diagram illustrating a UI screen for recommending a similar questions for a target question, according to an embodiment of the present disclosure. Referring to FIG. 10, when the server 100 searches for a similar question to the target question registered by the user 1 and transmits the similar question to the user terminal 10, the user terminal 10 may display a second UI screen 1000.

A target question 1010 may be displayed on the left of the second UI screen 1000, and first and second similar question boxes 1100 and 1200 may be displayed on the right thereof.

A first similar question "I want to know an answer to the first question" may be displayed in the first similar question box 1100, and a ranking (the first level) of the first similar question may be displayed in a region 1110. The user 1 may evaluate satisfaction on the recommendation of the first similar question through evaluation buttons 1120 included in the first similar question box 1100. When the user 1 determines that similarity between the first similar question and the target question 1010 is high, the user 1 may evaluate a result of the recommendation as "satisfactory" by selecting a left icon (a smile icon) among the evaluation buttons 1120. When the user 1 evaluates the result of recommendation as "satisfactory", the server 100 may register and manage the target question 1010 and the first similar question as "a pair of close questions". According to one embodiment, when any one of questions included in the pair of close questions is searched for as a similar question to a certain target question, the server 100 may recommend the other question included in the pair of close questions as the similar question.

The first similar question box 1100 may include a movement button 1130, and when the user 1 selects the movement button 1130, the user 1 may move to a page in which a registered answer to the first similar question may be checked. Accordingly, the user 1 may easily check registered answers to the recommended similar questions.

The second similar question box 1200 may be displayed in the same format as the first similar question box 1100. A second similar question "where is the correct answer uploaded?" is displayed in the second similar question box 1200, and a ranking (a second level) of the second similar question is displayed in a region 1210. The user 1 may evaluate satisfaction on recommendation of the second similar question through evaluation buttons 1220 included in the second similar question box 1200. The user 1 may move to a page in which a registered answer to the second similar question may be checked by selecting a movement button 1230 included in the second similar question box 1200.

According to the embodiments described above, when a user registers a question in an online platform, a question similar to the registered question is recommended to the user, and the user may resolve his or her curiosity through the previously registered answer to the recommended similar question. Therefore, there is an advantage in that a user may quickly check answers to questions and an administrator may eliminate the hassle of answering to similar questions one by one.

A term "~unit" or "~portion" used in the above embodiments indicates software or a hardware component, such as a field programmable gate array (FPGA) or an application-specific integrated circuit (ASIC), and a "unit" or a "~portion" performs a certain role. However, a "~unit" or a "~portion" is not limited to software or hardware. A "~unit" or a "~portion" may be configured to be in an addressable storage medium and may be configured to reproduce one or more processors. Therefore, a "~unit" or a "~portion" may include, for example, components, such as software components, object-oriented software components, class components, and task components, and processes, functions, properties, and procedures, subroutines, segments of a program patent code, drivers, firmware, microcode, circuitry, data, databases, data structures, tables, arrays, and variables.

Functions provided within components and a "~unit" or a "~portion" may be combined into smaller numbers of components and a "~unit" or a "~portion" or may be separated from additional components and a "~unit" or a "~portion".

In addition, components and a "~unit" or a "~portion" may be implemented to reproduce one or more central processing units in a device or a secure multimedia card.

The method of recommending a similar question according to the embodiments described with reference to FIGS. 4 to 7 may also be implemented in the form of a computer-readable medium storing instructions and data executable by a computer. In this case, instructions and data may be stored in the form of program codes, and when executed by a processor, a preset program module may be generated to perform a preset operation. In addition, a computer-readable medium may be any available medium that may be accessed by a computer and includes both volatile and nonvolatile media, removable and non-removable media. In addition, a computer-readable medium may be a computer recording medium, which may include volatile and non-volatile media and removable and non-removable media implemented in any method or technology for storing information, such as computer-readable instructions, data structures, program modules, or other data. For example, the computer recording medium may be a magnetic storage medium, such as a hard disk drive (HDD) or a solid-state drive (SSD), an optical recording medium, such as a compact disk (CD), a digital video disk (DVD), or a Blu-ray disc, or a memory included in a server accessible through a network.

In addition, the method of recommending a similar question according to the embodiments described with reference to FIGS. 4 to 7 may be implemented as a computer program (or a computer program product) including instructions executable by a computer. A computer program includes programmable machine instructions processed by a processor and may be implemented in a high-level programming language, an object-oriented programming language, an assembly language, or a machine language. In addition, the computer program may be recorded on a tangible computer-readable recording medium (for example, a memory, a hard disk, a magnetic/optical medium, or an SSD).

Accordingly, the method of recommending a similar question according to the embodiments described with reference to FIGS. 4 to 7 may be implemented by executing a computer program by using a computing device as described above. A computing device may include at least some of a processor, a memory, a storage device, a high-speed interface connected to the memory and a high-speed expansion port, and a low-speed interface connected to a low-speed bus and the storage device. The components may be connected to each other through various buses and may be mounted on a common motherboard or mounted in any other suitable manner.

Here, a processor in a computing device may process commands, for example, commands stored in a memory or storage device to display graphic information for providing a graphic user interface (GUI) on an external input/output device, such as a display connected to a high-speed interface. In another example, multiple processors and/or multiple buses may be used along with multiple memories and memory types as appropriate. In addition, a processor may be implemented as a chipset including chips including a plurality of independent analog and/or digital processors.

In addition, a memory in a computing device may store information. In one example, the memory may include a volatile memory unit or a collection of volatile memory units. In another example, the memory may include a non-volatile memory unit or a collection of non-volatile memory units. The memory may also be another form of computer readable medium, such as, a magnetic disk or an optical disk.

In addition, a storage device may provide a large amount of storage space to a computing device. The storage device may be a computer-readable medium or a component that includes the computer-readable medium and may include, for example, devices in a storage area network (SAN) or other components and may be a floppy disk device, a hard disk device, an optical disk device, a tape device, a flash memory device, another semiconductor memory device similar thereto, or a device array.

According to any one of the above-described object achievement devices, when a user registers a question in an online platform, questions similar to the registered question are recommended to a user, and the user may satisfy his or her curiosity through previously registered answers to the recommended similar questions. Therefore, form a user's point of view, there is an advantage in quickly checking an answer to a question, and from an administrator's point of view, there is an effect of reducing the hassle of individually answering similar questions.

Effects that may be obtained from the present embodiments are not limited to the effect described above, and other effects not described will be understood clearly to those skilled in the art from the description below to which the present embodiments belong.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method comprising:
receiving a question from a user;
converting the received question into a vector by performing vector embedding;
storing the vector in a document store;
checking a class connected to the received question;
connecting the class to at least one other class based on a preset algorithm;
setting a search range for searching for a question similar to the received question by including a plurality of questions connected to the class and the at least one other class;

searching for at least one question similar to the received question within the set search range; and
recommending the at least one searched question to the user,
wherein the searching for at least one question comprises:
selecting, based on at least one keyword, a plurality of candidate vectors within the search range; and
inferring similarity between the vector of the received question and each candidate vector by executing, by a processor, a neural network model trained to perform similarity inference.

2. The method of claim 1, wherein the searching for at least one similar question includes:
excluding at least part of text included in the received question according to a preset criterion;
extracting at least one keyword from the text from which the at least part is excluded; and
searching for the at least one question based on the extracted keyword.

3. The method of claim 1, wherein the searching for at least one similar question includes:
first searching of selecting a plurality of questions within the search range based on at least one keyword included in the received question; and
second searching of assigning a priority to the plurality of questions selected as a result of the first searching by inferring similarity between the received question and the plurality of selected questions by using a neural network model learned to perform similarity inference.

4. The method of claim 3, wherein, in the recommending of the at least one searched question to the user, a preset number of questions are recommended in order of the assigned priority, and the assigned priority is marked for each recommended question.

5. The method of claim 1, wherein the setting of a search range for searching for the similar question includes:
checking a class connected to the received question; and
setting a plurality of questions connected to the checked class as the search range.

6. The method of claim 5, wherein, in the checking of the class, a class in which the user participates is identified as a class connected to the received question.

7. The method of claim 5, wherein, in the checking of the class, a class designated when the user inputs the question is identified as a class connected to the received question.

8. The method of claim 5, wherein the setting of the search range for searching for the similar question includes:
connecting a class connected to the received question to at least one other class; and
adding a plurality of questions connected to the at least one other class to the search range.

9. The method of claim 8, wherein, in the connecting of the class, the class is connected to the at least one other class selected according to an administrator's choice or according to a preset algorithm, and the preset algorithm connects the two classes to each other when participants in the two classes overlap each other by a preset ratio or more.

10. A recording medium comprising:
a non-transitory computer-readable recording medium on which a program for a computer to execute the method of claim 1 is recorded.

11. A computer program that is executed by a computing device and is stored in a non-transitory computer-reasonable recording medium for performing the method of claim 1.

12. A computing device that recommends a similar question, the computing device comprising:

an input/output interface configured to receive a question from a user and configured to recommend at least one question similar to the received question to the user;

a memory configured to store a program for searching for and recommending the similar question; and at least one processor, wherein the at least one processor executes the program to receive a question from a user, convert the received question into a vector by performing vector embedding, store the vector in a document store, check a class connected to the received question, connect the class to at least one other class based on a preset algorithm, set a search range for searching for a question similar to the received question by including a plurality of questions connected to the class and the at least one other class, search for at least one question similar to the received question within the set search range by selecting, based on at least one keyword, a plurality of candidate vectors within the search range and inferring similarity between the vector of the received question and each candidate vector by executing, by a processor, a neural network model trained to perform similarity inference, and recommend the at least one searched question to the user.

13. The computing device of claim 12, wherein, when searching for at least one similar question, the at least one processor excludes at least part of text included in the received question according to a preset criterion, extracts at least one keyword from the text from which the at least part is excluded, and searches for the at least one question based on the extracted keyword.

14. The computing device of claim 12, wherein, when searching for at least one similar question, the at least one processor performs first searching of selecting a plurality of questions within the search range based on at least one keyword included in the received question, and performs second searching of assigning a priority to the plurality of questions selected as a result of the first searching by inferring similarity between the received question and the plurality of selected questions by using a neural network model learned to perform similarity inference.

15. The computing device of claim 14, wherein, in recommending the at least one searched question to the user, the at least one processor recommends a preset number of questions in order of the assigned priority and marks the assigned priority for each recommended question.

16. The computing device of claim 12, wherein, when setting a search range for searching for the similar question, the at least one processor checks a class connected to the received question, and sets a plurality of questions connected to the checked class as the search range.

17. The computing device of claim 16, wherein, when checking the class, the at least one processor identifies a class, in which the user participates, as a class connected to the received question.

18. The computing device of claim 16, wherein, when checking the class, the at least one processor identifies a class designated when the user inputs the question as a class connected to the received question.

19. The computing device of claim 16, wherein, when setting the search range for searching for the similar question, the at least one processor connects a class connected to the received question to at least one other class, and adds a plurality of questions connected to the at least one other class to the search range.

20. The computing device of claim 19, wherein, when connecting a class connected to the received question to the at least one other class, the at least one processor connects the class to the at least one other class selected according to an administrator's choice or according to a preset algorithm, and the preset algorithm connects the two classes to each other when participants in the two classes overlap each other by a preset ratio or more.

* * * * *